US 007574651B2

(12) United States Patent
Ebrahimi et al.

(10) Patent No.: US 7,574,651 B2
(45) Date of Patent: Aug. 11, 2009

(54) VALUE SYSTEM FOR DYNAMIC COMPOSITION OF PAGES

(75) Inventors: Armin G. Ebrahimi, Los Gatos, CA (US); Daniel L. Rosensweig, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 393 days.

(21) Appl. No.: 10/758,969

(22) Filed: Jan. 15, 2004

(65) Prior Publication Data

US 2006/0161843 A1 Jul. 20, 2006

Related U.S. Application Data

(60) Provisional application No. 60/483,191, filed on Jun. 26, 2003.

(51) Int. Cl.
*G06F 17/00* (2006.01)
*G06F 15/16* (2006.01)
*G06Q 30/00* (2006.01)

(52) U.S. Cl. .................. 715/243; 709/209; 715/234; 705/14

(58) Field of Classification Search ............... 715/513, 715/243, 234; 709/209; 705/14
See application file for complete search history.

(56) References Cited

U.S. PATENT DOCUMENTS

| 6,055,573 | A  | * | 4/2000 | Gardenswartz et al. ...... 709/224 |
| 6,385,592 | B1 | * | 5/2002 | Angles et al. ................. 705/14 |
| 6,560,578 | B2 | * | 5/2003 | Eldering ....................... 705/14 |
| 6,714,975 | B1 | * | 3/2004 | Aggarwal et al. ........... 709/224 |
| 7,062,510 | B1 | * | 6/2006 | Eldering .................... 707/104.1 |
| 7,246,312 | B2 | * | 7/2007 | Harrington et al. .......... 715/255 |
| 2003/0025620 | A1 | * | 2/2003 | Bland ........................... 341/61 |
| 2003/0046161 | A1 | * | 3/2003 | Kamangar et al. ............ 705/14 |
| 2003/0149938 | A1 | * | 8/2003 | McElfresh et al. .......... 715/517 |
| 2004/0044571 | A1 | * | 3/2004 | Bronnimann et al. ......... 705/14 |
| 2004/0143569 | A1 | * | 7/2004 | Gross et al. ..................... 707/3 |
| 2004/0186776 | A1 | * | 9/2004 | Llach ........................... 705/14 |
| 2004/0267612 | A1 | * | 12/2004 | Veach ........................... 705/14 |
| 2005/0021397 | A1 | * | 1/2005 | Cui et al. ....................... 705/14 |

* cited by examiner

*Primary Examiner*—Doug Hutton
*Assistant Examiner*—Henry Orr
(74) *Attorney, Agent, or Firm*—Brinks Hofer Gilson & Lione

(57) ABSTRACT

Pages are dynamically composed in order to increase the overall value of the page. In one approach, the overall value of the page is a function of the actual values of the page components that compose the page. These, in turn, are functions of the nominal value of the page components and of an effectiveness of the page components on the page. The actual values of the page components are expressed in a same unit of measure, thus facilitating direct comparison of their relative values.

58 Claims, 17 Drawing Sheets

Fig. 4A

| Component | Category | Nominal value | Effectiveness | Actual Value |
|---|---|---|---|---|
| SARS Story | Content | 95 | 50% | 47.5 |
| [North banner DSL House Ad image] | North banner DSL House Ad | 40 | 15% | 6.0 |
| [East banner News House Ad image] | East banner News House Ad | 20 | 5% | 1.0 |
| [Health insurance rates too high? image] | Sky banner Health Insurance External Ad | 80 | 10% | 8.0 |
| [SARS news links image] | Link to News videos on SARS | 20 | 10% | 2.0 |
| News Front Page | Generic News navigation Link | 5 | 2% | 0.10 |
| Top Stories | Generic News navigation Link | 2 | 2% | 0.04 |
| U.S. National | Generic News navigation Link | 2 | 2% | 0.04 |
| Crimes and Trials | Generic News navigation Link | 2 | 2% | 0.04 |
| Business | Generic News navigation Link | 2 | 2% | 0.04 |
| World | Generic News navigation Link | 2 | 2% | 0.04 |
| Entertainment | Generic News navigation Link | 2 | 2% | 0.04 |
| Sports | Generic News navigation Link | 2 | 2% | 0.04 |
| Technology | Generic News navigation Link | 2 | 2% | 0.04 |
| ... | Generic News navigation Link | 2 | 1% | 0.02 |
| Full Coverage (about Pakistan) | Generic News Link | 2 | 4% | 0.08 |
| [Ratings Box image] | Ratings Box | 5 | 2% | 0.10 |
| Next Story: Bush Arrives in Calif. For Iraq Speech | News Link | 2 | 2% | 0.04 |
| More Top Stories | News Link | 4 | 1% | 0.04 |
| 12 SARS Patients Report Relapses | Related news link | 40 | 4% | 1.6 |
| U.S. not ready to say was is over | News Link | 2 | 1% | 0.02 |
| ... | News Links | 2 | 1% | 0.02 |
| ChaseR Platinum Visa: 0% APR | Text Link Ad | 2 | 1% | 0.02 |
| What will it take to save for a college education? | Text Link Ad | 2 | 1% | 0.02 |
| TRADE FREE for a MONTH! | Text Link Ad | 2 | 1% | 0.02 |
| Home Equity Rates as Low as 4.0% | Text Link Ad | 2 | 1% | 0.02 |
| | Page Totals | 343 | 20% | 66.9 |

| Component | Category | Nominal Value | Effectiveness | Actual Value |
|---|---|---|---|---|
| SARS Story | Content | 95 | 80% | 76.0 |
| 12 SARS Patients Report Relapses | Related news link | 40 | 10% | 4.0 |
| *Health insurance rates too high?* | Sky banner Health Insurance External Ad | 80 | 20% | 16.3 |
| *abc NEWS on Yahoo! LIVE Platinum DON'T JUST READ THE NEWS, WATCH IT LIVE. click here* | East banner News House Ad | 20 | 20% | 4.0 |
| | Page Totals | 235 | 43% | 100.3 |

YAHOO! Tickets

Buy Sports, Concert & Theater Tickets Here

Yahoo! - Help

*razorgator* WORLD'S LARGEST PREMIUM TICKET PROVIDER

Post an Ad · My Classifieds · Sign Out

Welcome, mattc2

Yahoo! Classifieds

Classifieds > Tickets > Sports > Basketball > NBA Detail

Cool and Helpful
- Post a Classifieds Ad
- Take the Classifieds Tour
- Transfer Money Online
- Get Directions
- Put Your Photos Online
- Search Yellow Pages

San Antonio Spurs Series B-2 vs. Los Angeles Lakers
San Antonio, Texas [Map it]

NBA Playoffs Tickets: San Antonio Spurs Series B-2 on Wednesday, May 7, 2003 at Sbc Center / Section: 225 / Row: 13 / Qty: 4 / Price: $156 per ticket.

Details          Click Here for Purchase Information

| | |
|---|---|
| Price Per Ticket: | $156.00 |
| Tickets Available: | 4 |
| Section: | 225 |
| Row: | 13 |
| Seat(s): | |

Contact Information

Phone: (800) 852-7771

Event Date: May 7 2003
Event Time:
Venue: SBC Center
Venue Location: San Antonio, TX ✉ Reply to this Ad

YAHOO! Tickets

Welcome, mattc2
Yahoo! Classifieds

Classifieds > Tickets > Sports > Basketball > NBA Detail

Post an Ad - My Classifieds - Sign Out

Yahoo! - Help

San Antonio Spurs Series B-2 vs. Los Angeles Lakers
San Antonio, Texas [Map it]

NBA Playoffs Tickets: San Antonio Spurs Series B-2 on Wednesday, May 7, 2003 at Sbc Center / Section: 225 / Row: 13 / Qty: 4 / Price: $156 per ticket.

Details:

| | |
|---|---|
| Price Per Ticket: | $156.00 |
| Tickets Available: | 4 |
| Section: | 225 |
| Row: | 13 |
| Seat(s): | |

Click Here for Purchase Information

| | |
|---|---|
| Event Date: | May 7 2003 |
| Event Time: | |
| Venue: | SBC Center |
| Venue Location: | San Antonio, TX |

Contact Information

Phone: (800) 852-7771

Reply to this Ad

Weather
San Antonio  77.93F
TX

San Antonio Info

City Guides
· Restaurant Reviews
· Nightlife
· More...

Nearby Businesses
· Banks
· Gas Stations
· Restaurants
· More...

VALUE SYSTEM FOR DYNAMIC COMPOSITION OF PAGES

CROSS-REFERENCE TO RELATED APPLICATION

This application claims priority under 35 U.S.C. § 119(e) to U.S. Provisional Patent Application Ser. No. 60/483,191, "Value System for Dynamic Composition of Pages," filed Jun. 26, 2003.

BACKGROUND OF THE INVENTION

1. Field of the Invention

This invention relates generally to composing pages in response to user requests. More specifically, it relates to dynamically composing pages in order to increase the overall value of the pages.

2. Description of the Related Art

Pages on the Internet are typically statically composed. In many cases, a page is laid out by a web designer, loaded onto a web site, and then forgotten. Requests for the page can return the same page over and over again, even if more relevant information is available. Some web sites have dynamic feeds of content, in which content (or ads) are provided on a dynamic basis. For example, stock quotes can be continuously updated or a headline news article can be periodically changed. However, the layout of the overall page, including which components are on the page and the placement of those components (including the placement of the stock quote or ad) typically is static. There is no attempt to optimize the overall value of the page on an on-going basis.

From another point of view, many web sites are filled with information and links to other locations via ads and/or content links. The intent of each link is to provide the user with an option to take a click action to reach something of value to him. However, the user can only click once on any given page, regardless of how many links are available. Hence, in some sense, a page is more valuable if the most important links are the easiest to click on. Statically composed pages typically do not meet this criterion because they are static. What is important for one user may not be important for another, and what is important also changes over time.

In addition, the relevancy of different pages can change over time. For example, a sports site and a music site typically are not that related. As a result, statically composed sports pages and music pages typically would not have many links between them. However, the Dixie Chicks sang at Super Bowl 2003 and for a brief period of time they were covered by various sports sites. For many of these sports sites, there was not enough time to manually insert related links, for example to pages showing Dixie Chicks videos or other related music information. These links would have been both relevant and valuable during that period.

This capability is especially valuable to web sites that can provide a number of vertical properties. In the Super Bowl—Dixie Chicks example, a web site might offer both sports and music destinations. The integration of the two would have resulted in more value than the sum of the parts because of the synergy created during that period. More generally, large web sites, such as those with many vertical properties, can have access to a vast number of individual page components that can be assembled in many different combinations to compose web pages. Currently, the web pages are statically composed. It would be beneficial to dynamically compose web pages in order to increase the overall value of the web pages.

SUMMARY OF THE INVENTION

The present invention overcomes the limitations of the prior art by dynamically composing pages in order to increase the overall value of the page. In one approach, a page is composed of various components (e.g., content, links, ads), which shall be referred to as page components. A set of candidate components for the page is identified, with each candidate component having a nominal value. A subset of the candidate components is selected for placement on the page as the page components. The selection is based on increasing an actual page value of the page. The actual page value is a function of the actual values of the page components. Each of these, in turn, is a function of the nominal value of the page component and of an effectiveness of the page component on the page. The actual values of the page components are expressed in a same unit of measure, thus facilitating direct comparison of their relative values.

In one specific formulation, the actual page value equals a sum of the actual values of the page components, and the actual value of each page component equals the nominal value of the page component multiplied by the effectiveness of the page component on the page. The nominal value can be a function of the user request but is independent of the interaction with other components on the page (e.g., it does not account for clutter), which is accounted for by the effectiveness. The nominal value of a component can depend on a number of factors, including the following: financial impact, relevancy to the user request, relevancy to the user's demographic or behavioral profile, which version of the component is used (e.g., narrowband version vs. broadband version), size and "catchiness" of the component. The effectiveness can also depend on a number of factors, including for example interaction with other components (e.g., clutter or synergy) and placement on the page. In one specific approach, the dynamic composition begins with a default page (e.g., the statically composed page) and then selectively eliminates components in order to increase the actual page value of the page.

In another aspect of the invention, different components are registered before they are available for use in dynamically composing pages. Other aspects of the invention include systems and computer readable media corresponding to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4A is a graphical representation of a page that is statically composed.

FIG. 4B is a table showing a page value calculation for the page in FIG. 4A.

FIG. 5A is a graphical representation of a page that is dynamically composed according to the present invention.

FIG. 5B is a table showing a page value calculation for the page in FIG. 5A.

FIGS. 6A-6B, 7A-7C and 8A-8C are further examples of graphical representations of statically and dynamically composed pages.

DETAILED DESCRIPTION OF THE PREFERRED EMBODIMENTS

Figure 1:
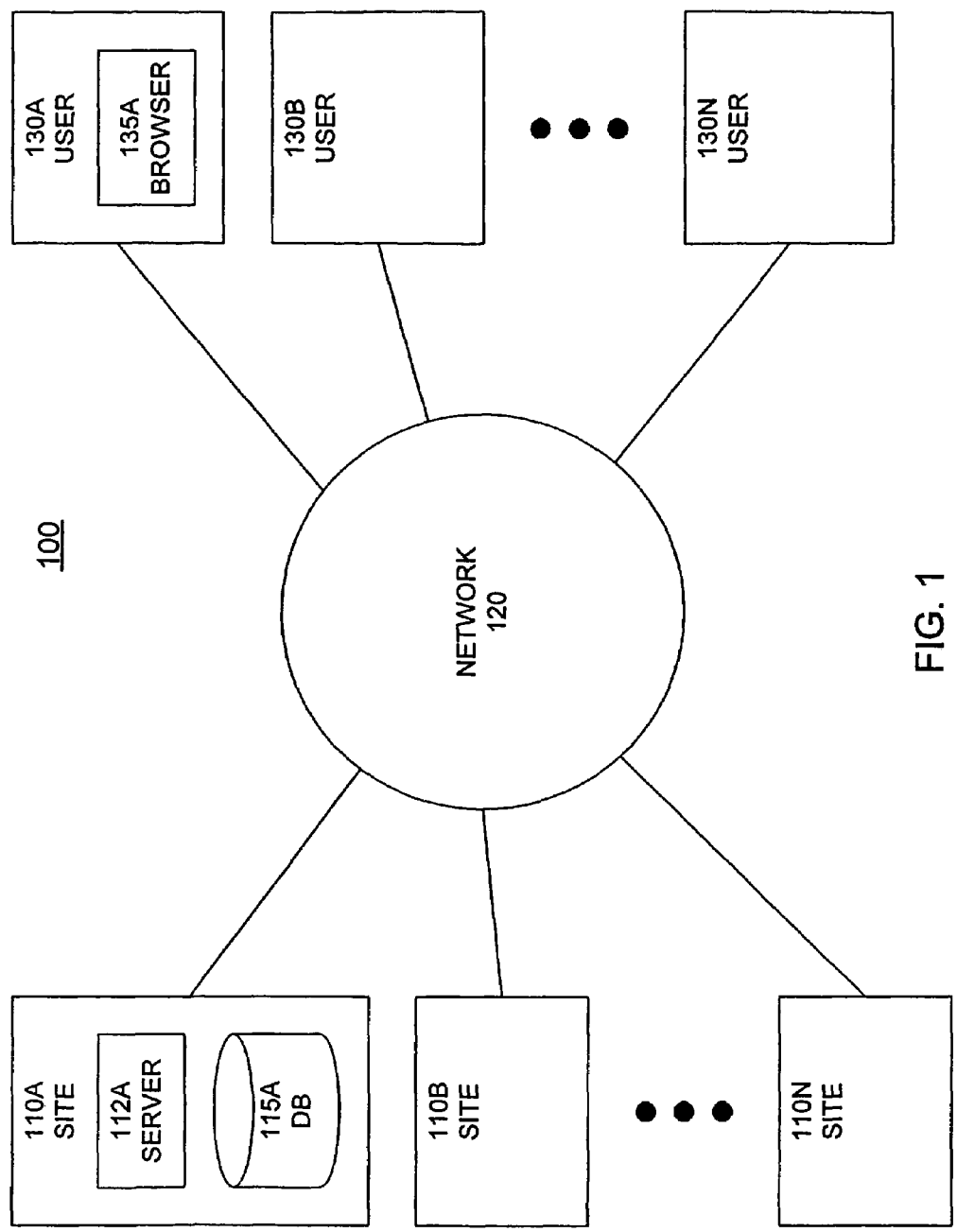
FIG. 1 is a block diagram of a system suitable for use with the present invention.
Figure 2:
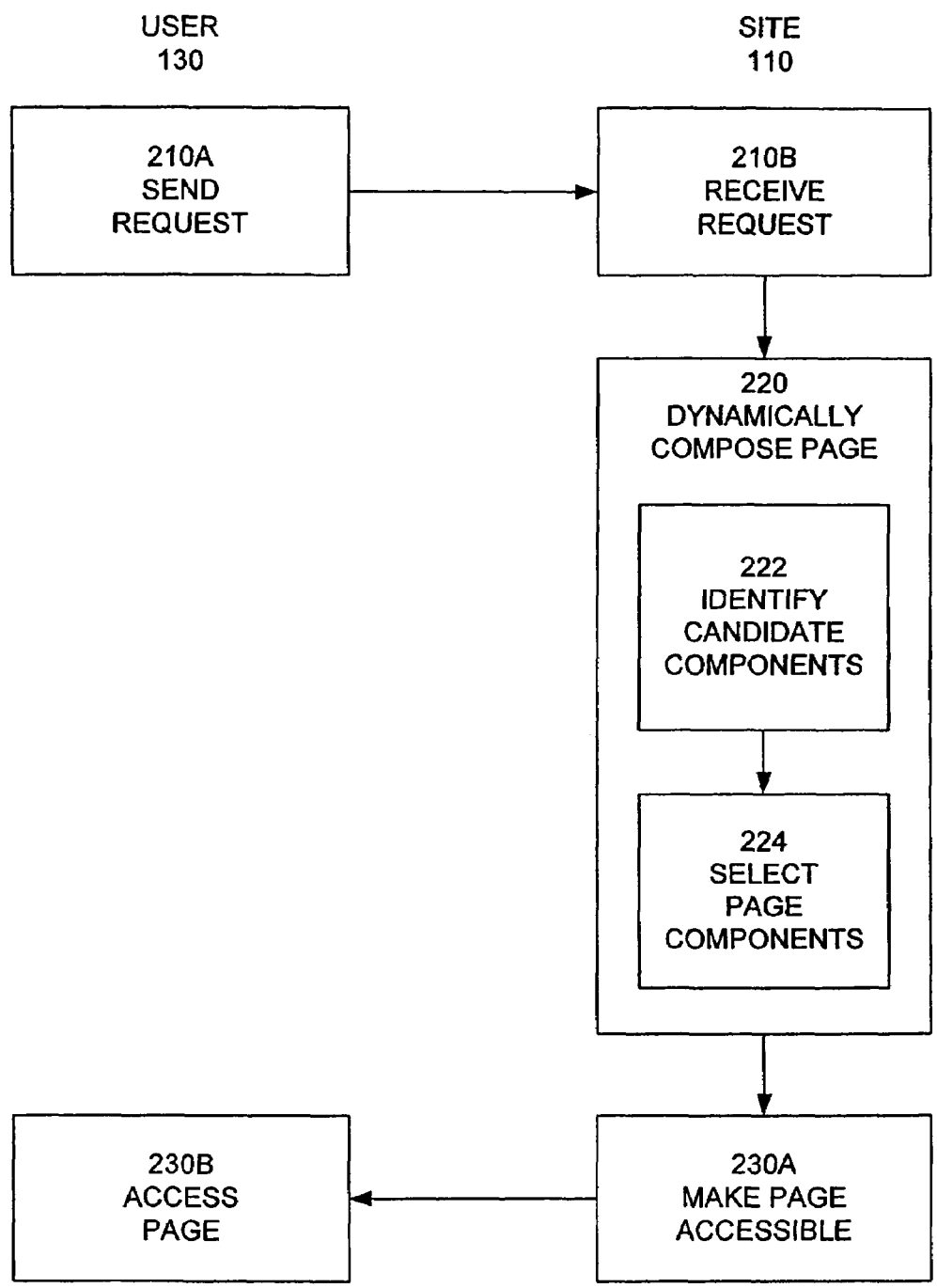
FIG. 2 is an event trace for dynamically composing pages.

FIG. 1 is a block diagram of an example system 100 suitable for use with the present invention, and FIG. 2 is an event trace illustrating the operation of system 100. Generally speaking, the system 100 includes a number of sites 100A-N and users 130A-N that communicate with each other over a network 120. Referring to FIG. 2, a user 130 sends 210A a request to a site 110. In response to the request, the site 110 dynamically composes 220 a page (or a portion of a page). The site 110 makes 230A the page accessible to the user 130 and the user 130 typically accesses 230B the page.

In the specific embodiment shown in the interior of block 220, the page is dynamically composed 220 as follows. The page itself is made up of individual components that shall be referred to as page components. The site 110 can select from a large number of components in composing the page. The site 110 narrows down the universe of possible components by identifying 222 a set of candidate components for the page. For example, if the request concerns Disneyland, the candidate components might include articles about Walt Disney or Disneyland, ads for vacation packages or airfare, and links to related sites or other parts of the same site. Components that may be excluded from the candidate set might include articles about Hillary Clinton, ads for expensive jewelry and links to financial sites.

From the set of candidate components, the site 110 selects 224 a subset of components for placement on the page as page components. The selection is made on the basis of increasing the overall value of the page. More specifically, each candidate component has a nominal value that reflects the value of that component, typically without taking into account the interaction of components on a page. The actual value of a component on a page may be different from (typically lower than, but possibly higher than) the nominal value. For example, a component that is lost in excessive clutter will be less effective and have an actual value less than its nominal value. Conversely, a component that has high synergy with another component can be "super effective" and have an actual value greater than its nominal value, although the two synergistic components may reduce the effectiveness of other components on the page. In any event, the actual page value is a function of the actual values of the individual page components, which in turn is a function of both the nominal value of the component and its effectiveness on the page.

In one specific embodiment, the network 120 is the Internet. The sites 110 include web sites, such as Yahoo!'s various properties: Launch!, News, Finance, etc. The users 130 include individuals who access the Internet, typically by browsers 135A such as Netscape's Navigator or Microsoft's Internet Explorer. The users 130 can also include other entities, such as software agents, spiders or bots that access sites under software control. The sites 110 transmit web pages to the users 130 in response to their requests. A typical site architecture is shown in FIG. 1. A web server 112A provides an interface to the Internet and a database 115A contains information about the components used to compose pages. The components themselves may or may not be included as part of the database 115A.

It should be noted that FIG. 1 is simplified for clarity. For example, the users 130A-N and sites 110A-N are shown as separate entities. In fact, the same entity may play both the role of a user and of a site. Entities may also take on different roles in different contexts. In addition, the roles of user and/or site can be distributed and/or divided among many different entities. For example, in order to compose and serve a page to a user 130A, a site 110A may request an article from another site (note the site 110A is acting as a user in this context), obtain ads from a third party ad server, and obtain some graphics and links from its internal database. The site itself may also be distributed for redundancy and/or performance reasons. For example, large sites such as Yahoo! typically run different web properties from different servers and use an architecture that is more sophisticated than that shown in FIG. 1. Multiple servers, databases, load balancers, etc. can be used to implement an actual site.

As further clarification, although the Internet will be used as the primary example in this disclosure, the invention may be used with other systems also. For example, the entities 110A and 130A may communicate with each other over separate communications networks or dedicated communications channels, rather than through the common network 120 of FIG. 1. Alternately, various parts of system 100 may be implemented by mobile components and may not be permanently attached to a communications network. For example, user 130A may interact with the other entities via a wireless connection.

Figure 3:
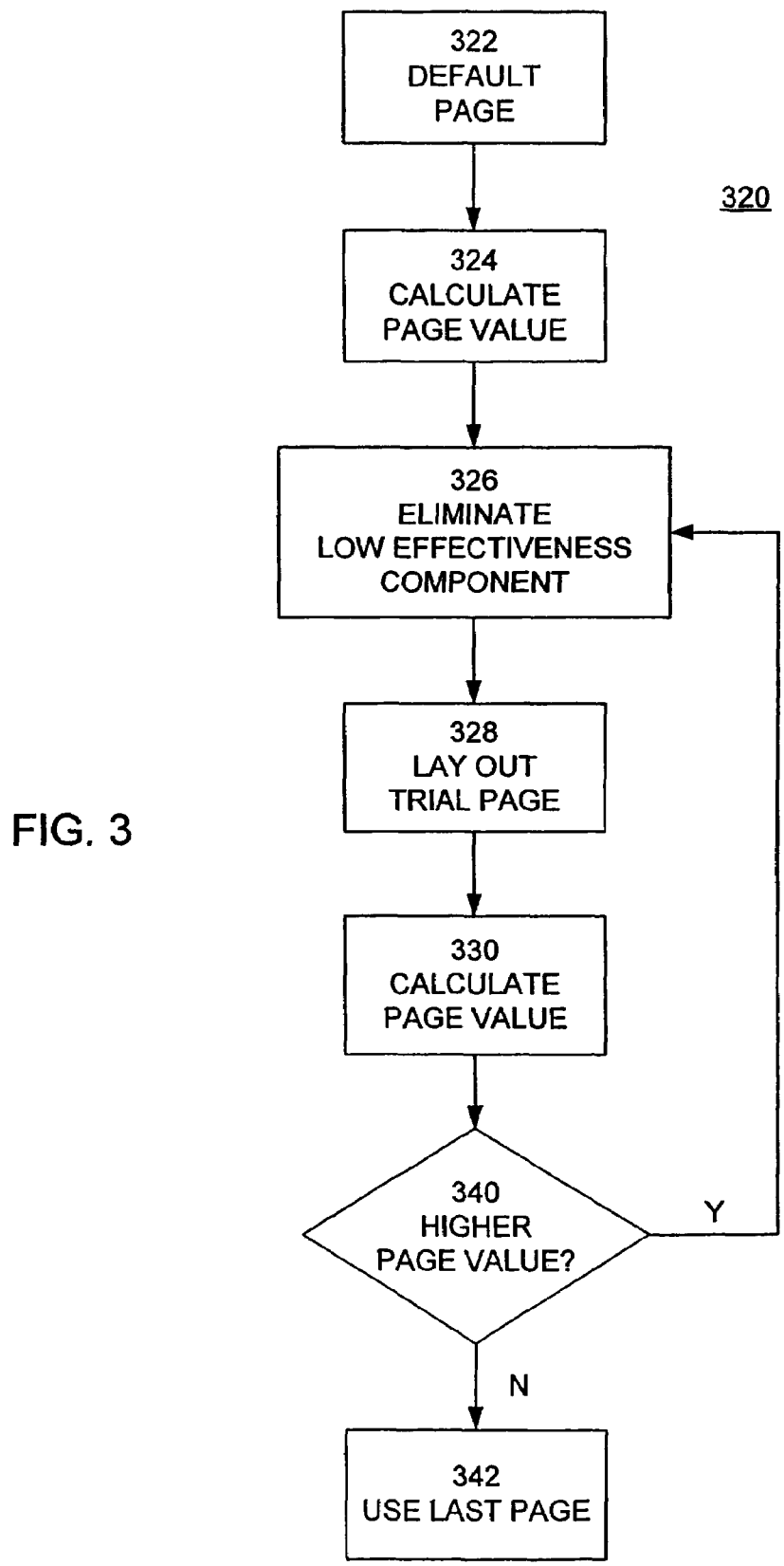
FIG. 3 is a flow diagram of a method for dynamically composing a page according to the invention.

Returning to the Internet example FIGS. 3-8 illustrate various examples comparing static composition to dynamic composition of pages in response to the same request. FIG. 3 is a flow diagram of an example dynamic composition method 320 suitable for use with these figures. In method 320, there is a default page 322 for the request. For example, the default page can be the statically composed page that would be served in the absence of dynamic composition. The components in the statically composed page are used as the candidate components for the dynamically composed page. The normal value, effectiveness and actual value of the components as placed on the default page are calculated 324, as is the actual page value.

Next, a loop tries to improve the actual page value by eliminating the components with low effectiveness. Based on the calculations 324, the component with the lowest effectiveness is eliminated 326 on a trial basis. The page is laid out 328 again with the remaining components, and the component effectiveness, actual component value, and actual page value are recalculated for the trial page. In this example, the elimination of a component does not affect the nominal values of the remaining components. Therefore, there is no need to recalculate these. If the new page value is higher 340 than the old page value, the component is permanently eliminated and the loop is repeated for the next least effective component. If the new page value is lower 340 than the old page value, the old page composition is used 342. That is, the trial elimination of the component is not accepted and the process completes.

This approach tries to identify and eliminate components that do not positively enhance the value of the page, thus reducing clutter. The goal is a simpler page that is more relevant, easier to navigate, and produces a higher value to the user. In this environment, paid ads ideally would also be of greater value to the advertisers because they would be more relevant and there will be less clutter to detract from the ads. The combination of these two factors ideally should increase the rates charged for those ads, as well as create a more compelling advertising medium.

Approaches other than the one shown in FIG. 3 can also be used to dynamically compose a page. For example, some approaches do not use a loop. Rather, a non-iterative method is used to select which candidate components are used to compose the page. In one approach, the formulations for the nominal value and effectiveness of candidate components can yield closed form solutions for the page with the highest actual page value. In another approach, heuristic methods can be used to select the candidate components.

Figure 4A:
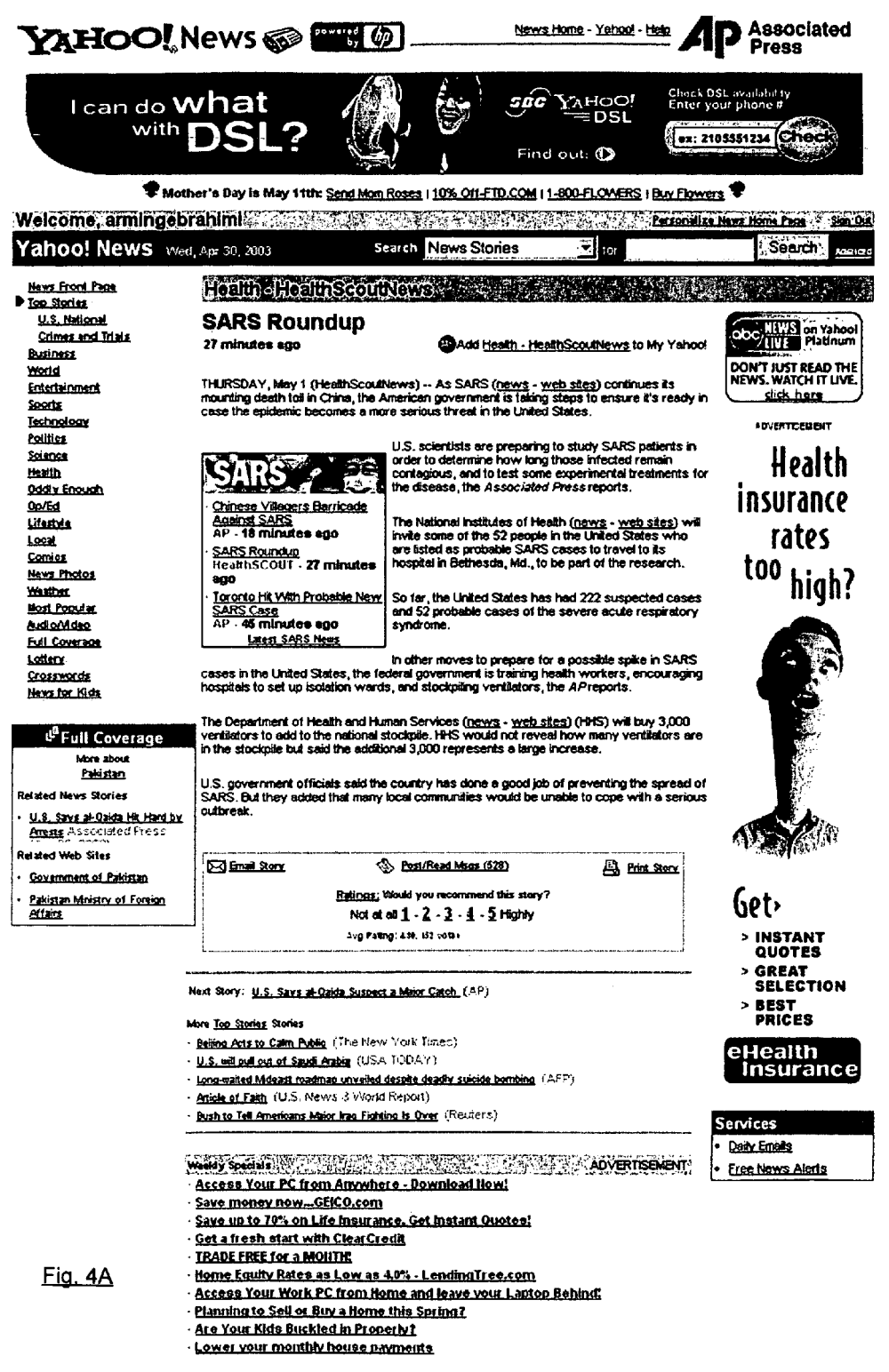

FIG. 4A is a graphical representation of a page that is statically composed. In this example, the user begins on a News page that contains links to various top news stories. The user clicks on the link to a SARS story. FIG. 4A shows the corresponding page. The page is statically composed because the selection and placement of the components does not change in an effort to increase the overall value of the page. However, the components themselves may be dynamic. For example, the specific offers in the "Weekly Specials" ad at the south end of the page may rotate, or the content of the news article "SARS Roundup" may change as the news story is updated by reporters. However, the page composition itself is static.

Note that the page contains a number of different types of components, including content, links and ads. Each of these component types can be further subdivided. Examples of content include articles (e.g., news articles), images (e.g., maps), tables (e.g., TV listings), charts (e.g., stock analysis), multimedia (e.g., video clips), and interactive scripts (e.g., games). Examples of links include lists of links (e.g., search results), internal links to other parts of the same property, links to third party properties, navigational links (to help navigate the property) and functional links (e.g., the "compose" button in Y! Mail, or the Sign In link in Y! My). Examples of ads include external ads (i.e., ads for third parties), house ads (i.e., ads for Yahoo!), performance ads, and sponsored listings.

Different components serve different purposes. For example, requested content is typically the focus of the user experience and should not be overwhelmed by other components. Navigational links help put the page in context and functional links implement various functions on the page. House ads promote or integrate other Yahoo! properties but at the same time compete with one another and with external ads, which typically generate direct revenue.

In order to optimize or at least increase the overall value of a page, tradeoffs between different components must be made. A common value system is used to facilitate this tradeoff. The values of the different page components are expressed using the same unit of measure. In this way, different components can be directly compared and tradeoffs can be made in a systematic and even automated manner.

FIG. 4B is a table showing the calculation of the value of the page in FIG. 4A using one specific type of common value system. Each page component has a nominal value. In this example, the nominal value may change as a function of the request or the user's profile. For example, the SARS Story has a nominal value of 95 because the request was a link to the SARS story. If the request had been a link to an unrelated news story, the nominal value of the SARS story would have been much lower. As another example, the Health Insurance Ad has a nominal value of 80 because it has strong relevancy to SARS, but it would have a lower nominal value in the context of non-health news stories. The nominal value of the Health Insurance Ad might also vary depending on the user profile and/or the CPM rate for the ad. The CPM rate is the cost per thousand views of the ad. For example, the nominal value might be higher for a user that was in the target demographic group or for ads with higher CPM rates. As a final example, the DSL ad is a house banner ad that is randomly placed on pages. It would likely have the same nominal value of 40 when placed on some other news page. The nominal value of the More Top Stories News link likely is also approximately constant across different news stories.

The nominal value of a component depends on a number of factors and its exact formulation can vary. However, financial impact, relevancy and form are factors that are usually considered when determining the nominal value. Examples of financial impact are revenues generated (e.g., the effective CPM rate for paid ads) and costs (e.g., payments made to third parties for use of their content). House ads can also be valued by financial impact, for example on the basis of a charge back cost or an opportunity cost for displacing a paid ad.

Relevancy can take a number of forms: relevancy to the request, relevancy to the page that generated the request, and/or relevancy to a user profile, to name a few. Examples of user profiles include demographic profiles and behavioral profiles. Relevancy can also be measured in different ways. For example, one simple approach is based on matching keywords or other subject matter descriptors. If the request concerns SARS, and a component is explicitly targeted to the keyword SARS, there will be high relevancy. A similar approach can be used for user profiles. If the user is in demographic category X (e.g., as determined by either self-reported data or based on the user's behavior) and the component is targeted to category X, there will be high relevancy.

Context matching can also be used to determine relevancy. The idea behind context matching is that a component becomes part of the page if the context is relevant. For components that are part of a web site, relevancy can be determined based on conventional search engine technology, such as is available from Inktomi, Y! Search, Autonomy, Google and Overture. For components that cannot be analyzed based on their position on the web, relevancy can be determined by context matching technologies, such as those developed by Applied Semantics and ContextWeb.

Form refers to the impact of the component. For example, is the component a text link, a static banner, a banner with motion, includes high-tech special effects, etc. Size and shape of the component typically also impacts the nominal value. For components that have multiple versions—for example, a text version, an image version, and a high bandwidth video version—the nominal value can vary from version to version. However, bigger, fancier and faster is not always better, particularly given any bandwidth constraints that the user may have.

Whatever the factors used to determine the nominal value, the different factors are weighed against each other to come up with a single nominal value for the component. In one approach, the nominal value can simply be a weighted sum of the different factors. The unit of measure can vary. In FIGS. 4-5, the nominal values are expressed in unitless dimensions. However, one alternative is to express the nominal value in dollars per impression. In online advertising an impression may refer to the displaying of an ad to a user or any other contact that a user may have with an ad.

Returning to FIG. 4B, in this example, the nominal value of a component is not affected by the placement of the component on the page or what other components are placed on the page. Thus, components that appear in both FIGS. 4A and 5A have the same nominal value, regardless of their placement and the overall page composition. One advantage of this approach is that the nominal value of components need not be recalculated for different trial page compositions.

The effectiveness value is the factor that accounts for placement, page composition, etc. 100% effectiveness means that the component realizes its full nominal value in the page composition. Less than 100% effectiveness means that some effectiveness is lost, for example due to cropping of the component, peripheral or below the fold placement, or distraction from other components. Greater than 100% effectiveness can mean the component has some synergistic effect with another component on the page. In FIG. 4B, the actual value of each component and the actual value of the entire page are calculated as $$\text{Actual component value} = \text{Nominal component value} \times \text{Effectiveness} \quad (1)$$

$$\text{Actual page value} = \Sigma \text{ Actual component values} \quad (2)$$

The page effectiveness can be defined as $$\text{Page effectiveness} = \Sigma \text{ Actual component values}/\Sigma \text{ Nominal component values} \quad (3)$$

The effectiveness also depends on a number of factors and its exact formulation can vary. However, placement and clutter are factors that are usually considered when determining the effectiveness. For placement, the effectiveness of a component typically depends on whether it is placed above the fold, below the fold, north, south, east, west, center, etc.

Clutter is created when too many components are included on a page. The less important components distract from the more important ones. For example, referring to FIG. 4A, the Full Coverage box in the southwest corner distracts from the main news article and is not particularly relevant. This manifests itself in FIG. 4B as a lower effectiveness factor for the SARS Story. Empirical experiments can be used to model the influence of clutter on the effectiveness factor.

Alternately, simple mathematical models can be formulated, such as using the sum of the squares of the areas occupied by different components as a measure of the unclutteredness. The higher this factor, the less clutter there is. For example, if the page has a total area of 100, it can be occupied by one component with an area of 100 or by one hundred components each with an area of 1. The 1-component page has a factor of $100^2=10,000$. The 100-component page has a factor of $100(1^2)=100$. The 1-component page is much less cluttered than the 100-component page.

Returning to FIG. 4B, note that the main component—the SARS Story—has an effectiveness of only 50%. This is in part due to the clutter created by the vast number of other components. Each of these other components contributes some to the overall page value, but not enough to compensate for the decrease in effectiveness of the main component. Overall, the page has an actual page value of 66.9 and a page effectiveness of only 20%.

Figure 5A:
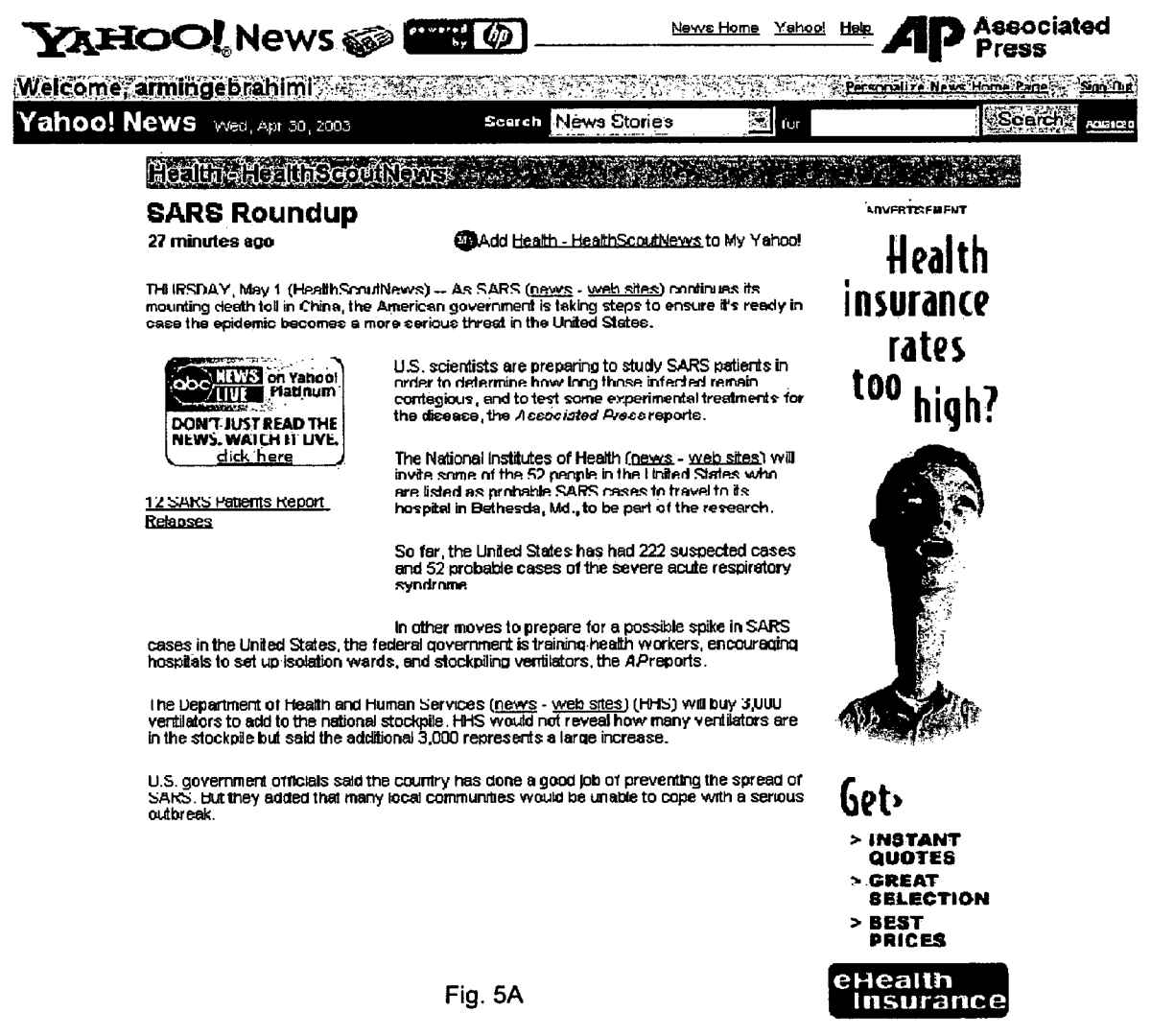

FIG. 5A is a graphical representation of a page that is dynamically composed, reducing the overall clutter. FIG. 5B is a table showing the value calculation for this page. The actual page value is 100.3, an increase of nearly 50% over FIG. 4. The page effectiveness has also risen significantly to 43%. Even though the total number of components and the nominal page value have decreased, the actual page value and effectiveness have increased.

Other definitions of nominal value, effectiveness and actual value will be apparent. For example, in an alternate approach, the effect of placement is accounted for in the nominal value rather than in the effectiveness factor. Alternately, the effect of placement may be ignored altogether in order to simplify the calculations. As another example, the nominal values of different components may be expressed in different units of measure and then converted to a common unit of measure for the actual values. For example, the nominal value of external ads may be expressed in effective CPM and the nominal value of news articles expressed in relevancy on a scale of 0 to 1.0. A conversion factor between the two allows actual values to be directly compared.

Figure 6A:
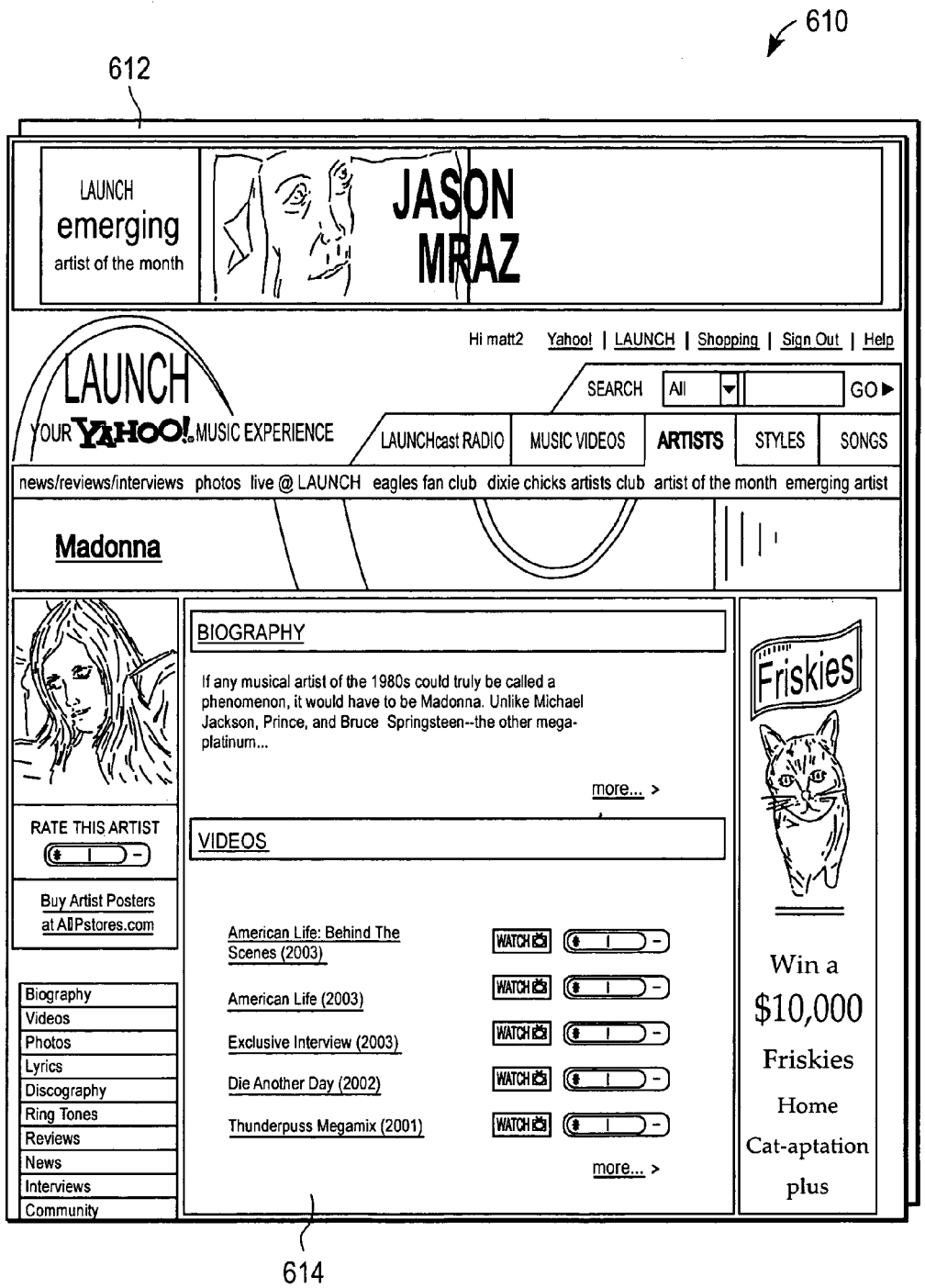
Figure 6B:
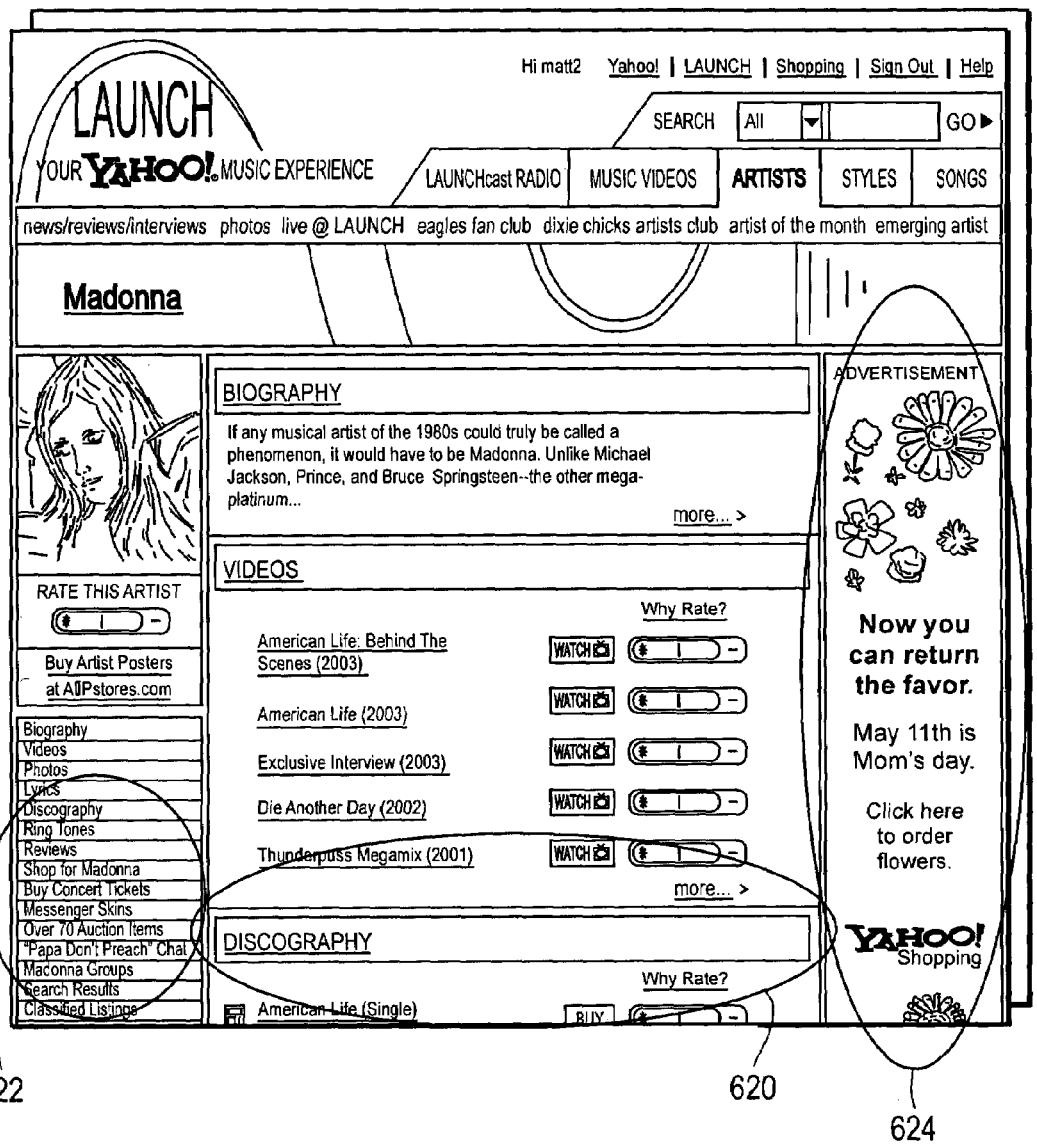
Figure 7A:
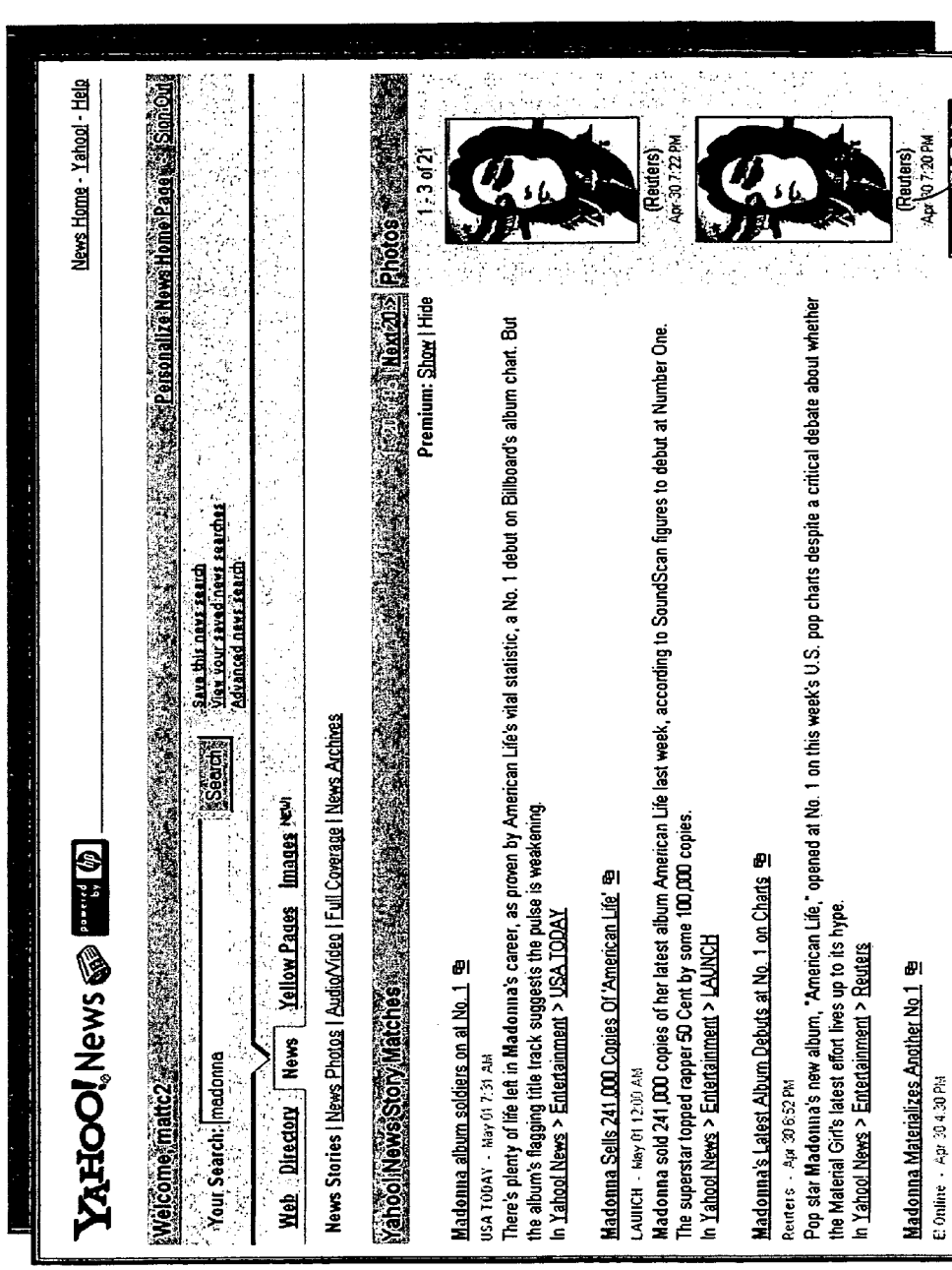

FIGS. 6-8 are further examples of static versus dynamic composition. The A figure is the statically composed page. The B and C figures are dynamically composed pages.

FIG. 6 is an example from Y! Launch. In FIG. 6A, the request is a search in Launch.yahoo.com for "Madonna." In FIG. 6B, the following changes have been made to increase the value of the page. The north banner (Jason Mraz) 610 is removed in order to allow for more real estate "above the fold." This increase in real estate allows revenue-generating content (Discography) 620 to move above the fold, significantly increasing the effectiveness of this content. On the west side, generic links (News, Interviews, etc.) 612 are replaced by specific contextual redirects 622 to Y! Shopping, Tickets, Messenger, Auctions, Chat, Groups, Search and Classifieds. The east side ad 614 for Friskies is replaced by an ad 624 that had a higher relevancy to the user's behavioral profile.

Figure 7B:
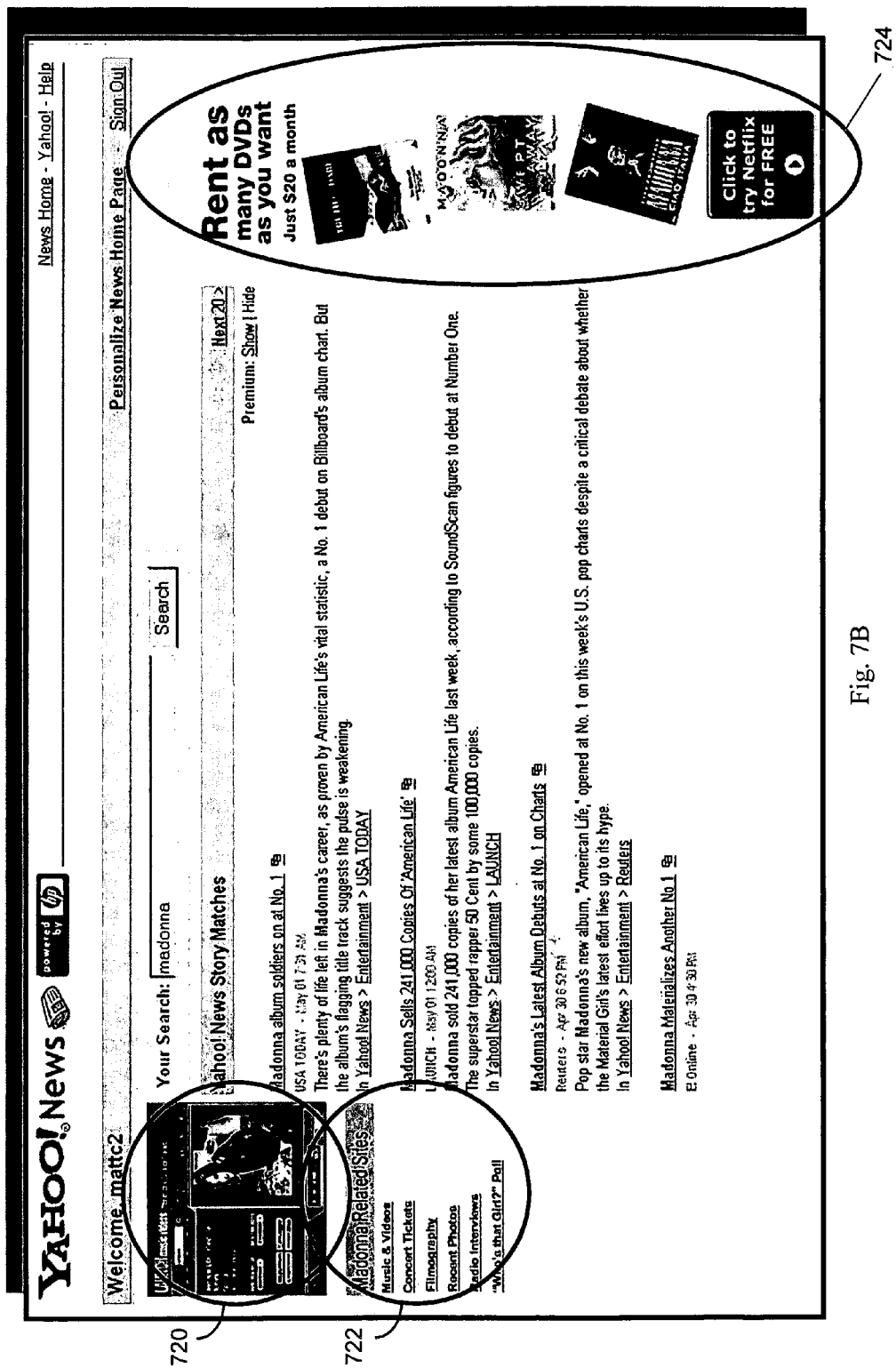
Figure 7C:
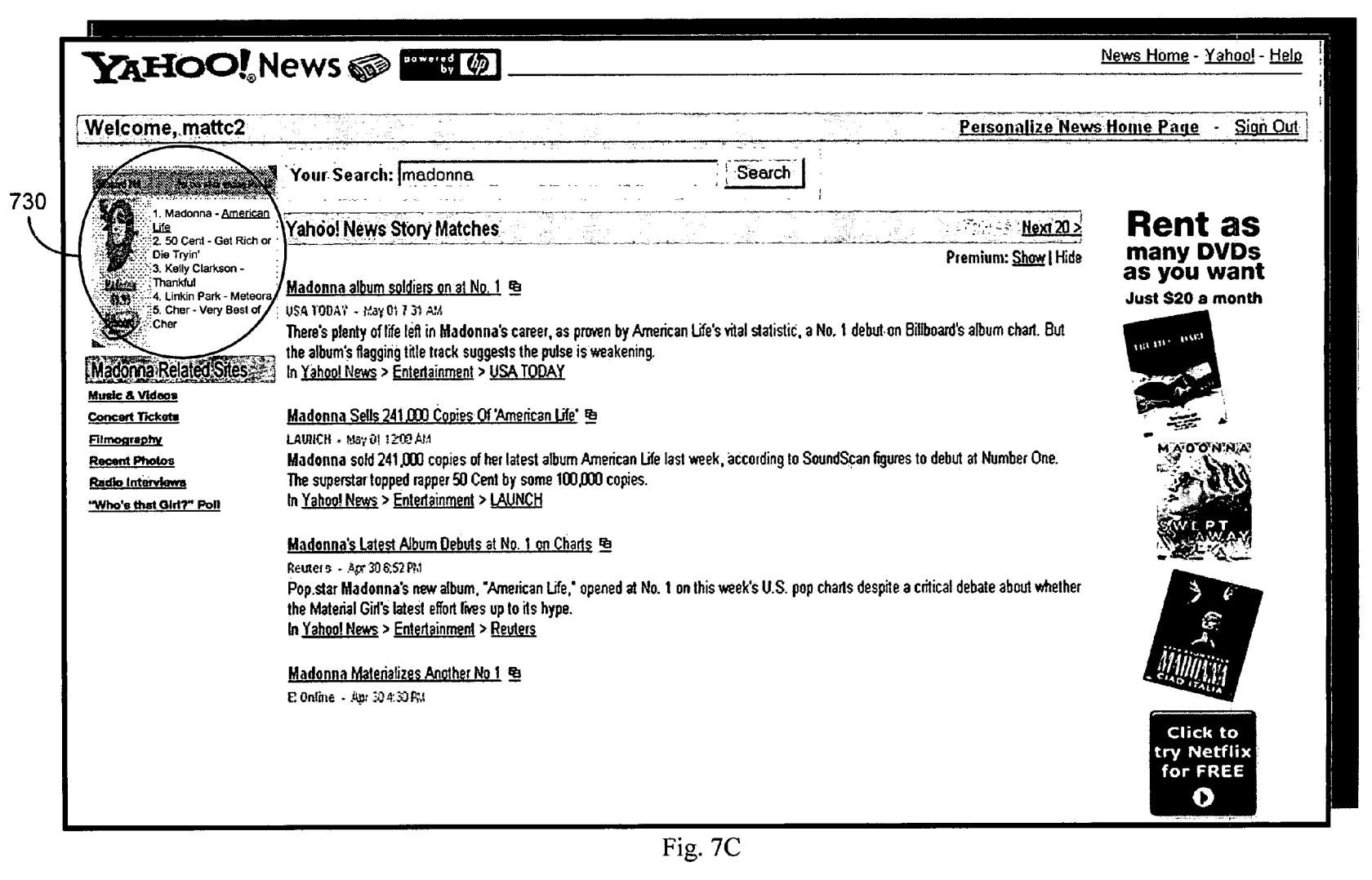

FIG. 7 is an example from Y! News. These pages are generated in response to a search request for "Madonna." In FIG. 7B, the user profile indicates that the user has a broadband connection. In FIG. 7C, the user has a dial up connection. The pages are dynamically composed, taking this into account. In FIG. 7B, a high broadband music video module 720 is served based on the user's broadband connection. In contrast, in FIG. 7C, a Y! Shopping module 730 is served instead. In both figures, the "Related Sites" module 722 is customized via contextual search results with links to Y! Launch, Tickets, Shopping, Photos, and Y! Platinum. The east side ad 714 is replaced by an ad 724 that has higher relevancy, based on a combination of the user's demographic profile and contextual search result. Note that in this example, components 720 and 722 were added to the dynamically composed page without significantly reducing the effectiveness of the main component, the search listing.

Figure 8B:
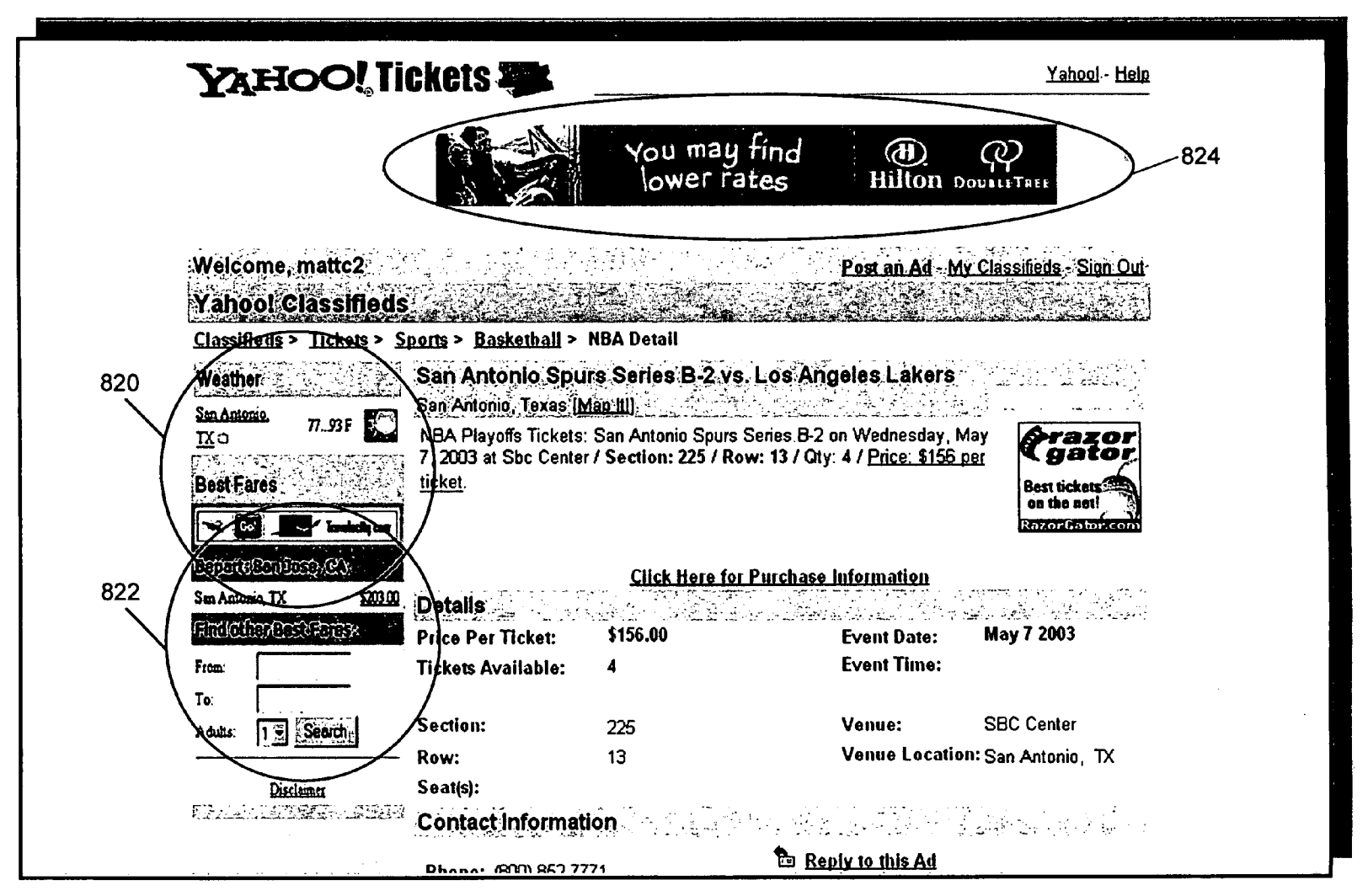

FIG. 8 is an example from Y! Tickets. In this example, the user is looking for tickets to a Spurs/Lakers game. The user profile indicates that the user is from San Jose (in FIG. 8B) or San Antonio (in FIG. 8C). The page is dynamically composed accordingly. In FIG. 8B, the west side content 810 is replaced by a weather module 820 and a Y! Travel module 822. The weather module 820 is targeted to the contextual result "San Antonio." The Y! Travel module 822 is pre-populated with San Jose as the departure city and San Antonio as the destination city. The north banner ad 824 is chosen to increase the relevancy of its content. In FIG. 8C, the San Antonio user presumably does not need plane tickets to San Antonio, so the Y! Travel module 822 is not served. Instead, a Get Local Module 832 is served to provide local information.

Figure 9:
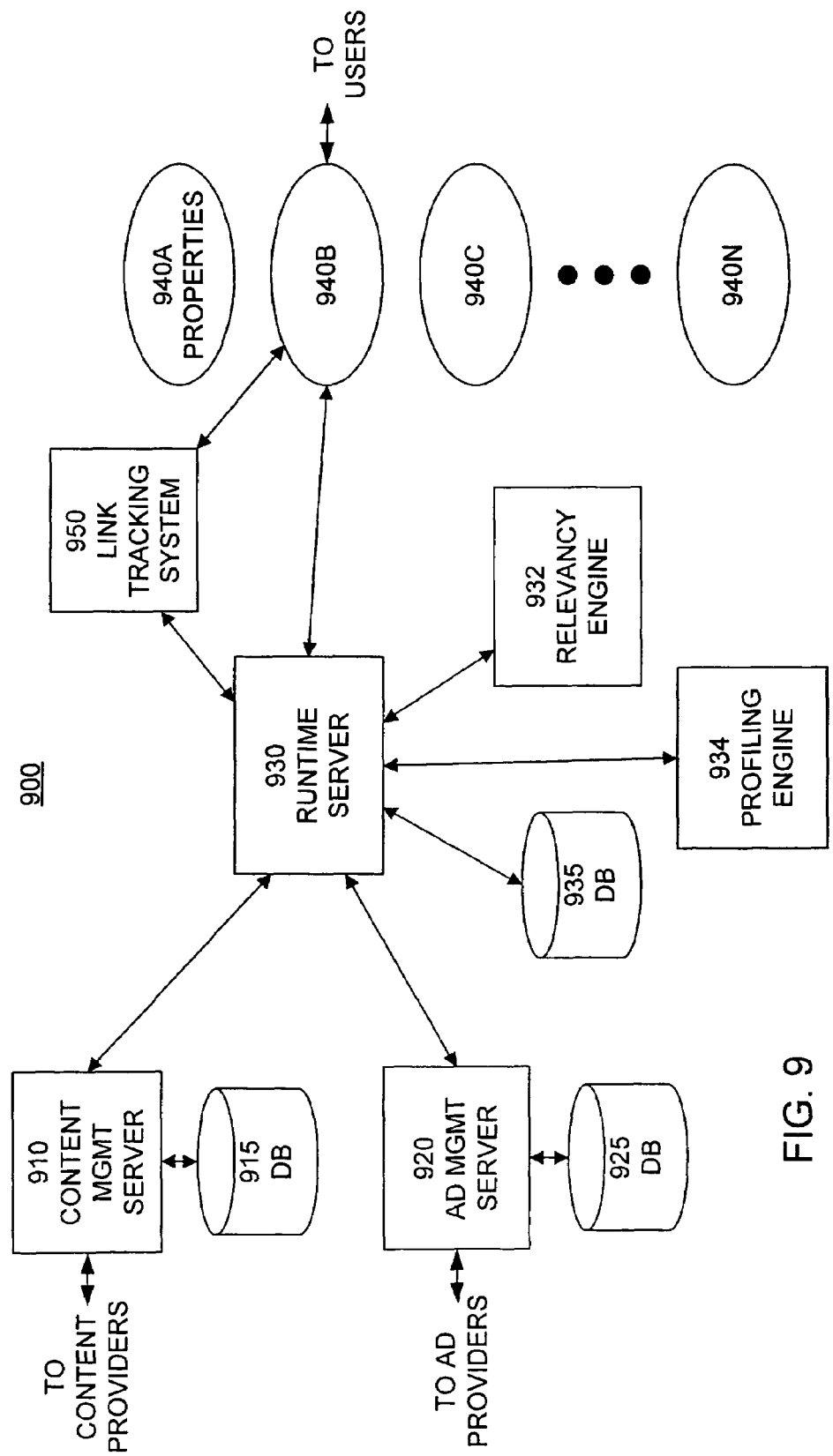
FIG. 9 is a block diagram of a system architecture for dynamically composing pages.

FIG. 9 is a block diagram of an example system architecture 900 for dynamically composing pages. This system 900 includes a content management server 910 and database 915, an ad management server 920 and database 925, and a runtime server 930 and database 935. The system 900 also includes site properties 940A-N. Y! Travel, Y! News, Y! Finance, etc. are examples of properties 940 for the Yahoo! site.

The system 900 is coupled as follows. Each server 910, 920, 930 can access its respective database 915, 925, 935. The content management server 910 and ad management server 920 also communicate with the runtime server 930, which in turn communicates with the properties 940. With respect to the outside world, users (such as 130 in FIG. 1) access the properties 940. Content providers interact with the system via the content management server 910, and ad providers (both third party and internal ad providers) interact with the system via the ad management server 920. System 900 is merely an example; other architectures will be apparent. For example, some or all ad providers and/or content providers might interact directly with the runtime server(s) 930 as well.

Returning to the Yahoo! Internet example for the moment, the servers preferably are implemented as yapache servers running on FreeBSD Intel boxes in a distributed environment. The corresponding databases can take various formats, including flat file, MySQL and Oracle. The two management servers 910 and 920 use a private network connection (i.e., not the Internet) to communicate with the runtime server 930, as does the runtime server 930 in its communications with the properties 940. The properties 940 are implemented on separate web servers (not shown in FIG. 9), which do the actual communications with the runtime server 930.

As described previously, the users generally access the Yahoo! properties 940 via browsers or by software controlled agents, spiders, etc. Providers of content and/or ads can access the management servers 910 and 920 in a number of ways. They can provide information about their components manually, for example by filling out and submitting forms or by submitting information according to a predefined template. Alternately, information can be transmitted via a predefined API interface to the management servers 910, 920. As another alternative, crawlers (or similar technology) that traverse different components on a network can discover information about the components and then report back to the management servers 910, 920.

Figure 10:
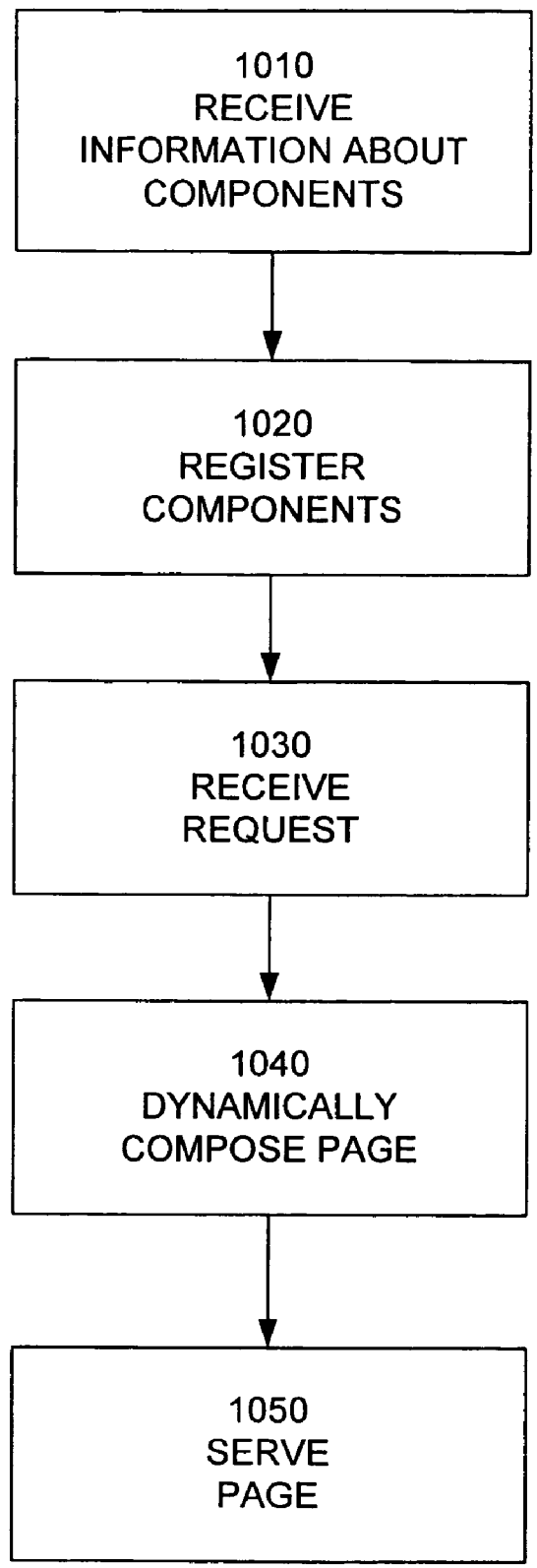
FIG. 10 is a flow diagram illustrating a method for operating the system of FIG. 9.

In more detail, example system 900 operates as shown in FIG. 10. The management servers 910, 920 receive 1010 information describing different components. In this example, ads are handled by the ad management server 920 and database 925, and all other components are handled by the content management server 910 and database 915. This is a natural division because ads, particularly paying ads, often have significantly different characteristics or warrant significantly different processing than other types of components. However, the division is not required and other architectures can be used. The management servers 910, 920 process the information and store corresponding records in the databases 915, 925.

The management servers 910, 920 also push the relevant subset of records to the runtime server 930, which processes these records and stores them in database 935. The runtime server 930 is responsible for responding to requests from the properties 940. Therefore, it is preferable for the runtime database 935 to store only the information needed to respond to these requests, in order to optimize the response time. The process of making a component available to the runtime server 930 is referred to as registration 1020. Once a component is registered, it is available to compose pages. When the runtime server 930 receives 1030 a request from a property, it dynamically composes 1040 a page, for example using the methods described above. In step 1050, the page is served.

The various databases can be updated in many ways. In a preferred approach, components (or updates to components) that come from active providers will be sent to the relevant management server 910, 920 by the provider. This can occur via an API interface to the management server 910, 920, by the provider submitting forms or templates, or by other means. The management servers 910, 920 push these changes to the runtime server 930 in a real-time or near real-time manner, as opposed to accumulating changes and making periodic batch updates. As a result, the changes typically will take effect in near real-time.

Information also can flow in the other direction. For example, providers and others typically can access the management servers 910, 920 to review their components, the effectiveness of their ad campaigns, etc. Information about the performance of components, such as the click-through rate, the number of impressions, etc., typically is collected by the properties 940 and flows back through the system for reporting and analysis purposes. This empirical feedback can also be used to adjust the nominal value and/or effectiveness calculations described above.

In one specific example, components are registered through a registration API or site, either automatically or partially manually, depending on how much information is already available on the page stamps for the components. Take third party web pages as an example. At one extreme, a process crawls through the pages of a property to collect and infer the necessary information for registration. At the other extreme, the web site owner manually registers only selected pages of the site. A mix of these two methods is also possible. For example, a web site may stamp its pages with a flag signifying whether they are to be exposed. The crawler process registers the pages that are to be exposed. Incomplete registrations can be identified and the web site notified to complete the registration.

The following are some examples of the type of registration information that can be provided for a component:

Component Name—Name provided by the component provider

Category Type—Typically predefined (e.g., News, Music, Sports, etc.). In one implementation, the Category Type maps directly to a property.

Category SubType—As defined by each property. For example, in News, the subtypes may be "current-events", "business", "sports", etc. These are also predefined.

Creation Date—Date when component was first registered.

Expiration Date—Date on which component should be deregistered. Component should not be used after the Expiration Date.

Target Parameters—Parameters that describe the profile of target users for this component. For example, this field might be defined as Males, 18-24, Professional. Alternatively, if left blank, the component provider believes the component is appropriate to all audiences.

Required bandwidth rating—The minimum data bandwidth required for this component, for example Modem, DSL, T1, etc.

Recommended bandwidth rating—The recommended minimum data bandwidth for good user experience.

Value parameters—Parameters that can be used in the value calculation. For example, certain components may have nominal values assigned by the component provider. The revenue rate for ads can be included as a value parameter.

Versions supported—Which versions are available for this component. For example, possible values might include Text-link reference, Icon and Text reference, Short version, and Long version.

Keyword(s)—One or more keywords that describe the category matches for this component. This field can also be used for contextual matching of relevant content and ads. Other types of subject matter descriptors can also be used.

These are example definitions. Other types of information can be provided. In addition, the information provided can depend on the type of component.

In addition to the description of the component, the component itself is also provided. Components can have multiple versions. The following are examples of different versions:

Text-Link reference—A text link reference with an appropriate title.

Icon and Text reference—Similar to a text-link reference along with a reference to an approved and predefined icon.

Short version—This could include graphics and content as appropriate but is brief in nature. For example, a shopping item may have all fields necessary to describe the item, show a picture of the item, and allow shopping transactions from the spot. Additionally, this typically will provide a link to the full detailed component.

Long version—Long version of the component as may be appropriate. For example, Launch! may provide a window for displaying a complete music video without having to click and go to a reference site.

Each of the versions may have a portion that is dynamic, for example provided by a live feed. Thus, registering a version does not necessarily mean that the entire version is stored in one of the databases. Rather, the version may include pointers for different subcomponents and/or it may be automatically updated by a push from the component provider.

The management servers 910, 920 preferably process this information to prepare it for the runtime server 930 and also preferably perform calculations that can be done a priori. For example, the information provided may be converted to a different format, or even enhanced, to faciliate searching. Various indices and/or reverse indices can be assembled in advance. In addition, keywords submitted by the component provider can be converted to a standardized set of keywords, or additional keywords applicable to the component may be added. As another example, the management servers 910, 920 can precalculate value or relevancy parameters that do not depend on run-time factors. For example, CPM values for paid ads or indirect revenue opportunities for a link to another property can be calculated in advance. In this way, the real-time calculation burden on the runtime server 930 is reduced. In the example of FIG. 9, the runtime server 930 is also coupled to a relevancy engine 932 and a profiling engine 934, which handle relevancy calculations and profile matching, respectively.

The overall system 900 maintains an active database of all registered components and schedules the components for searching and/or inclusion with other components. When the runtime server 930 receives a request from a property 940, the server typically will request both ads and content links given specific information about the page requested by the user along with user specific information passed via other sources, for example user cookies. The runtime server 930 uses the information passed to it to find relevant ads and content for the given page, and then optimizes the page value as described above.

The runtime server 930 may use information beyond what is provided in the component registration. For example, link tracking analysis, eCPM data, pageview statistics, specific user behavior as tracked by the system, and contextual matching techniques are additional capabilities that can be used by the runtime server 930 in its value evaluation. Keyword and content matching can be used to identify information that can be integrated into a coherent page. Link tracking analysis provides a measure of cross-property relevance, which can be used to sort multiple qualified content deliverables. Effective CPM can be used to update the value. Pageview statistics also give a quantitative measure on the importance of a content deliverable.

The high value page is sent to the property. The system 900 preferably also tracks user behavior and/or page and component effectiveness once the page is delivered. For example, in one implementation, the link tracking system 950 tracks all link follow-through on Yahoo! pages. Links include ads, text links, and forms (e.g. search box), for example. Link clicks as well as link views are tracked. Link tracking can be used to provide empirical feedback on the value of different components and/or combinations of components. It can also be used as an experimental test bed to test different models of relevance and/or value. For example, a test link can be set up between specific content on a page to other content on another page, and the click-through rate tracked to assess the effectiveness of the first page. This information can also be tracked on a user bases as well as in aggregate for the pages overall.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for building a web page comprising:

receiving a request from a user;

dynamically composing the web page in response to the request; and making the web page available to the user, wherein the step of dynamically composing the web page comprises:

identifying a set of candidate components used in a default composition of the web page, each candidate component in the set of candidate components having a nominal value;

selecting a subset of the candidate components for placement onto the web page as page components, wherein at least one component in the selected subset comprises an advertisement and at least one different component in the selected subset comprises a non-advertising content, further wherein the selecting is determined by an optimization of an actual page value of the web page;

placing the subset of the candidate components onto the web page as page components; and eliminating page components from the web page when such elimination increases the actual page value of the web page, further wherein the actual page value of the web page is a function of a respective actual value of each respective page component placed on the web page and wherein the actual value of each respective page component placed on the web page is determined by a nominal value of the respective page component and an effectiveness of the respective page component on the web page, wherein the effectiveness of the page component is based on a clutter of the web page, further wherein the respective actual value of each respective page component is based on a relevance of each respective page component to a context of the web page.

2. The method of claim 1 wherein the respective actual value of each respective page component placed on the web page is in a common unit of measure.

3. The method of claim 1 wherein the respective actual value of each respective page component placed on the web page is determined irrespective of a relevance of each respective page component to a search query.

4. The method of claim 1 wherein the respective actual value of each respective page component is based on a relevance of each respective page component to the other page components on the web page.

5. The method of claim 1 wherein:
the actual page value equals a sum of the actual values of the page components on the web page; and
the respective actual value of each respective page component on the web page equals the nominal value of the respective page component multiplied by the effectiveness of the respective page component on the web page.

6. The method of claim 1 further comprising determining a nominal value of a candidate component in said subset of the candidate components, wherein the candidate component is an advertisement page component, and the determining is based on a revenue generated by placement of the advertisement page component on the web page.

7. The method of claim 1 further comprising determining a nominal value of a candidate component in said subset of the candidate components based on a relevancy of the candidate component to the request.

8. The method of claim 7 wherein:
the request was generated by a requesting web page; and
the step of determining a nominal value of the candidate component based on a relevancy of the candidate component to the request comprises determining a nominal value of the candidate component based on a relevancy of the candidate component to the requesting web page.

9. The method of claim 8 wherein the candidate component is a content candidate component.

10. The method of claim 7 wherein the step of determining a nominal value of the candidate component comprises determining a nominal value of the candidate component based on a relevance of the candidate component to a demographic profile of the user.

11. The method of claim 7 wherein the step of determining a nominal value of the candidate component comprises determining a nominal value of the candidate component based on a geographic location of the user.

12. The method of claim 7 wherein the step of determining a nominal value of the candidate component comprises determining a nominal value of the candidate component based on a relevance of the candidate component to a behavioral profile of the user.

13. The method of claim 7 wherein:
the candidate component has a plurality of versions; and
the step of determining a nominal value of the candidate component comprises determining a nominal value of the candidate component based on the version of the candidate component placed on the web page.

14. The method of claim 1 further comprising:
tracking user follow-through on the web page; and
updating the nominal value of a page component on the web page in response to the tracking.

15. The method of claim 14 wherein the step of tracking user follow-through on the web page comprises tracking link follow-through on the web page.

16. The method of claim 1 wherein the effectiveness of the page component is based on the identity of another page component on the web page.

17. The method of claim 1 wherein the step of selecting a subset of the candidate components for placement on the web page as page components comprises:
for at least one page component, selecting a version of the page component.

18. The method of claim 17 wherein the step of selecting a version of the page component is based on an available bandwidth for the user.

19. The method of claim 1 wherein the step of dynamically composing a web page in response to the request comprises:
using a static composition for a portion of the web page; and
dynamically composing a remainder of the web page in response to the request.

20. The method of claim 1 wherein the request uniquely identifies a web page.

21. The method of claim 1 wherein the request comprises a search request.

22. The method of claim 1 wherein the step of making the web page available to the user comprises transmitting the web page to the user.

23. The method of claim 1 wherein:
the step of receiving a request from a user comprises receiving a request from the user via the Internet;
the step of dynamically composing a web page in response to the request comprises dynamically composing a web page in response to the request; and
the step of making the web page available to the user comprises transmitting the web page to the user via the Internet.

24. The method of claim 1 wherein the effectiveness of each respective page component is equal to the clutter of the web page.

25. The method of claim 24 wherein the clutter of the web page is computed using a mathematical model based on the areas occupied by the page components on the web page and a total area of the web page.

26. The method of claim 1 wherein the nominal value of each respective page component is equal to the relevancy of the respective page component to the request.

27. The method of claim 26 wherein the relevancy of a respective page value is provided by a third party application.

28. The method of claim 1 wherein the nominal value of each respective page component is assigned by a provider of the component.

29. A method for building a database of page components and for using said database to build a web page in response to a request from a user, the method comprising:
receiving information describing a plurality of page components;
registering the plurality of page components in a database of page components to reflect the received information;
receiving a request from a user;
identifying a set of candidate components from the database of page components used in a default composition of the web page, each candidate component having a nominal value;
selecting a subset of the candidate components for placement onto the web page as page components, wherein at least one component in the selected subset comprises an advertisement and at least one different component in the selected subset comprises a non-advertising content, further wherein the selecting is determined by an optimization of an actual page value of the web page;

placing the subset of the candidate components onto the web page as page components;

eliminating page components from the web page when such elimination increases the actual page value of the web page, wherein the actual page value of the web page is a function of a respective actual value of each respective page component placed on the web page and wherein the actual value of each respective page component placed on the web page is determined by a nominal value of the respective page component and an effectiveness of the respective page component on the web page, wherein the effectiveness of the page component is based on a clutter of the web page, further wherein the respective actual value of each respective page component is based on a relevance of each respective page component to a context of the web page, and further wherein the effectiveness increases when the page component has a synergistic effect with another page component on the web page and the effectiveness decreases when the page component incurs distraction from another page component on the web page; and making the web page available to the user.

30. The method of claim 29 wherein:

the step of receiving the request from a user comprises receiving a request from a web server on behalf of a browser operated by the user; and the step of making the web page available to the user comprises identifying the web page to the web server for communication of the web page to the browser operated by the user.

31. The method of claim 29 wherein:

the received information comprises a category for classifying a page component in said plurality of page components; and the step of identifying a set of candidate components from the database of page components comprises identifying the candidate component based at least in part on the category of each page component in the database of page components.

32. The method of claim 29 wherein:

the received information comprises a plurality of versions of each page component in the plurality of page components; and the step of selecting a subset of the candidate components for placement on the web page as page components comprises selecting one of said versions of the page component.

33. The method of claim 32 wherein the received information further comprises a bandwidth rating for one of said versions of the page component in the plurality of versions of the page component.

34. The method of claim 29 wherein, for each page component in at least a portion of the page components in the plurality of page components, the received information comprises relevant date information for the page component.

35. The method of claim 29 wherein:

the received information comprises a target demographic for each page component in the plurality of page components; and the nominal value for each page component is based on a match between the target demographic and a demographic profile of the user.

36. The method of claim 29 wherein:

the received information comprises a subject matter descriptor for a first page component in the plurality of page components; and the step of identifying a set of candidate components from the database of page components comprises identifying the first page component based at least in part on the subject matter descriptor for the first page component.

37. The method of claim 29 wherein the respective actual value of each respective page component placed on the web page is determined irrespective of a relevance of each respective page component to a search query.

38. The method of claim 29 wherein the respective actual value of each respective page component is based on a relevance of each respective page component to the other page components on the web page.

39. The method of claim 29 wherein the received information is received via a predefined application program interface.

40. The method of claim 29 wherein the step of receiving information describing the plurality of page components comprises:

crawling through a network of web pages; and generating information describing the plurality of page components within the network of web pages.

41. The method of claim 29 wherein the effectiveness of each respective page component is equal to the clutter of the web page.

42. The method of claim 41 wherein the clutter of the web page is computed using a mathematical model by a sum of the squares of the areas occupied by the page components on the web page.

43. The method of claim 29 wherein the nominal value of each respective page component is equal to the relevancy of the respective page component to the request.

44. The method of claim 43 wherein the relevancy of a respective page value is provided by a third party application.

45. The method of claim 29 wherein the nominal value of each respective page component is assigned by a provider of the component.

46. A computer readable medium having stored therein data representing instructions executable by a programmed processor for building a web page in response to a request from a user with a plurality of page components that can be used to compose the web page, the computer readable medium comprising instructions operative to:

receiving the request from the user;

composing the web page dynamically in response to the request;

identifying a set of candidate components for the web page from the plurality of page components, each candidate component having a nominal value;

selecting a subset of the candidate components for placement onto the web page as page components, wherein at least one component in the selected subset comprises an advertisement and at least one different component in the selected subset comprises a non-advertising content, wherein the selecting is determined by an optimization of an actual page value of the web page, wherein the actual page value of the web page is a function of a respective actual value of each respective page component placed on the web page and wherein the actual value of each respective page component placed on the web page is based on a nominal value of the page component and an effectiveness of the page component on the web page, wherein the effectiveness of the page component is based on a clutter of the web page, further wherein the respective actual value of each respective page component is based on a relevance of each respective page component to a context of the web page, and further wherein the effectiveness of the page component increases when the page component has a synergistic effect with another page component on the web page and the effectiveness of the page component decreases when the page component incurs distraction from another page component on the web page; and making the web page available to the user.

47. The computer readable medium of claim 46 further comprising instructions operative to:

calculating the actual page value as a sum of the actual values of the page components on the web page; and calculating the actual value of the page component as the nominal value of the page component multiplied by the effectiveness of the page component on the web page.

48. The computer readable medium of claim 46 further comprising instructions operative to:

determining the respective actual value of each respective page component placed on the web page irrespective of a relevance of each respective page component to a search query.

49. The computer readable medium of claim 46 further comprising instructions operative to:

determining the nominal values of the candidate components based on a relevance of each candidate component to a demographic profile of the user.

50. The computer readable medium of claim 46 further comprising instructions operative to:

determining the nominal value of the candidate component based on a relevance of the candidate component to a behavioral profile of the user.

51. The computer readable medium of claim 46 further comprising instructions operative to:

tracking link follow-through on the web page; and updating the nominal value of the page component in response to the tracking.

52. The computer readable medium of claim 46 wherein the respective actual value of each respective page component is based on a relevance of each respective page component an identity of another page component on the web page.

53. The computer readable medium of claim 46 further comprising instructions operative to:

receiving information describing the set of candidate components; and registering the set of candidate components.

54. The computer readable medium of claim 53 further comprising instructions operative to communicating a candidate component registration change.

55. The computer readable medium of claim 46 wherein the effectiveness of the page component is computed using a mathematical model incorporating the areas occupied by the page components on the web page and a total area of the page.

56. The method of claim 1 wherein the non-advertising content comprises a news article.

57. The method of claim 29 wherein the non-advertising content comprises at least one of an article, a map, and a chart.

58. The method of claim 46 wherein the non-advertising content comprises at least one of non-advertising link and a non-advertising search result.

* * * * *

UNITED STATES PATENT AND TRADEMARK OFFICE
CERTIFICATE OF CORRECTION

PATENT NO.       : 7,574,651 B2                                         Page 1 of 1
APPLICATION NO.  : 10/758969
DATED            : August 11, 2009
INVENTOR(S)      : Ebrahimi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Fourteenth Day of December, 2010

David J. Kappos
*Director of the United States Patent and Trademark Office*